United States Patent
Mohrlock

(10) Patent No.: US 11,633,995 B2
(45) Date of Patent: Apr. 25, 2023

(54) WHEEL SUSPENSION FOR A VEHICLE AXLE

(71) Applicant: AUDI AG, Ingolstadt (DE)

(72) Inventor: Dominik Mohrlock, Buxheim (DE)

(73) Assignee: AUDI AG, Ingolstadt (DE)

( * ) Notice: Subject to any disclaimer, the term of this patent is extended or adjusted under 35 U.S.C. 154(b) by 107 days.

(21) Appl. No.: 17/425,077

(22) PCT Filed: Jan. 22, 2020

(86) PCT No.: PCT/EP2020/051498
§ 371 (c)(1),
(2) Date: Jul. 22, 2021

(87) PCT Pub. No.: WO2020/187464
PCT Pub. Date: Sep. 24, 2020

(65) Prior Publication Data
US 2022/0105764 A1 Apr. 7, 2022

(30) Foreign Application Priority Data
Mar. 20, 2019 (DE) .................... 10 2019 203 836.0

(51) Int. Cl.
*B60G 3/20* (2006.01)
*B60G 7/00* (2006.01)

(52) U.S. Cl.
CPC ............ *B60G 3/20* (2013.01); *B60G 7/008* (2013.01); *B60G 2200/184* (2013.01);
(Continued)

(58) Field of Classification Search
CPC .... B60G 3/20; B60G 7/008; B60G 2200/184; B60G 2200/422; B60G 2200/466;
(Continued)

(56) References Cited

U.S. PATENT DOCUMENTS 2,115,918 A * 5/1938 Slack ................. B60G 3/20
280/124.141
4,170,373 A * 10/1979 Beck .................. B60G 7/001
280/124.141
(Continued)

FOREIGN PATENT DOCUMENTS

CN 105882741 A 8/2016
DE 69412909 T2 4/1999
(Continued)

OTHER PUBLICATIONS

German Search Report dated Mar. 26, 2020 in corresponding German Application No. 10 2019 203 836.0; 16 pages; Machine translation attached.

(Continued)

*Primary Examiner* — Paul N Dickson
*Assistant Examiner* — Timothy Wilhelm
(74) *Attorney, Agent, or Firm* — Maier & Maier, PLLC

(57) ABSTRACT

A wheel suspension for a vehicle axle of a two-track vehicle, having a wheel carrier carrying a vehicle wheel, which is able to be articulated to a vehicle body via a multi-link assembly, which multi-link assembly has a trapezoidal link in the form of a four-point link with two connection points on the body side and two connection points on the wheel carrier side. The trapezoidal link connection points on the wheel carrier side are designed with a higher elastic longitudinal compliance, that is, softer, than the trapezoidal link connection points on the body side.

16 Claims, 6 Drawing Sheets

(52) U.S. Cl.
CPC .. *B60G 2200/422* (2013.01); *B60G 2200/466* (2013.01); *B60G 2202/30* (2013.01); *B60G 2204/13* (2013.01); *B60G 2204/148* (2013.01); *B60G 2204/15* (2013.01); *B60G 2204/4104* (2013.01); *B60G 2204/4106* (2013.01); *B60G 2204/422* (2013.01); *B60G 2206/121* (2013.01); *B60G 2206/50* (2013.01); *B60G 2300/50* (2013.01)

(58) Field of Classification Search
CPC ............ B60G 2202/30; B60G 2204/13; B60G 2204/148; B60G 2204/15; B60G 2204/4104; B60G 2204/4106; B60G 2204/422; B60G 2206/121; B60G 2206/50; B60G 2300/50
See application file for complete search history.

(56) References Cited

U.S. PATENT DOCUMENTS

| | | | | |
|---|---|---|---|---|
| 4,457,536 A * | 7/1984 | Rumpel | ............... | B60G 3/26 280/124.144 |
| 4,466,635 A * | 8/1984 | Okada | ............... | B60G 7/008 267/248 |
| 4,529,221 A * | 7/1985 | Kijima | ............... | B60G 9/00 267/248 |
| 5,292,149 A * | 3/1994 | Luger | ............... | B62D 17/00 280/5.521 |
| 5,322,317 A * | 6/1994 | Kusaka | ............... | B60G 7/001 280/124.134 |
| 5,685,556 A * | 11/1997 | Shibue | ............... | B60G 7/008 280/124.13 |
| 6,241,262 B1 * | 6/2001 | Suess | ............... | B60G 3/14 280/5.522 |
| 6,357,543 B1 * | 3/2002 | Karpik | ............... | B62M 27/00 180/182 |
| 6,588,779 B2 * | 7/2003 | Sandahl | ............... | B60G 11/08 280/124.135 |
| 7,588,261 B2 * | 9/2009 | Kawanobe | ............ | B60G 21/051 280/124.128 |
| 7,699,326 B2 * | 4/2010 | Yamada | ............... | B60G 7/008 280/124.125 |
| 7,784,806 B2 * | 8/2010 | Schmidt | ............... | B60G 3/26 280/124.134 |
| 7,832,750 B2 * | 11/2010 | Gerrard | ............... | B60G 7/001 280/124.144 |
| 8,056,912 B2 * | 11/2011 | Kawabe | ............... | B60G 3/20 280/124.135 |
| 8,267,416 B2 * | 9/2012 | Allen | ............... | B60G 3/20 280/124.135 |
| 8,342,542 B2 * | 1/2013 | Sagara | ............... | B60G 7/008 280/5.522 |
| 8,678,409 B2 * | 3/2014 | Koide | ............... | B60G 7/008 280/124.135 |
| 8,690,177 B2 * | 4/2014 | Buchwitz | ............ | G06F 16/245 280/124.135 |
| 9,333,824 B2 * | 5/2016 | Zandbergen | ............ | B60G 3/20 |
| 9,340,082 B2 * | 5/2016 | Hintzen | ............... | B60G 7/001 |
| 9,358,851 B2 * | 6/2016 | Zandbergen | ............ | B60G 11/16 |
| 9,555,683 B2 * | 1/2017 | Eismann | ............... | B60G 9/022 |
| 9,849,743 B2 * | 12/2017 | Kuwabara | ............ | B60G 7/001 |
| 11,072,215 B2 * | 7/2021 | Drotar | ............... | B60G 7/008 |
| 11,186,132 B2 * | 11/2021 | Shin | ............... | B60G 7/02 |
| 11,299,003 B2 * | 4/2022 | Kim | ............... | B60G 7/001 |
| 11,440,364 B2 * | 9/2022 | Müller | ............... | B29C 53/68 |
| 2005/0051988 A1 * | 3/2005 | Gradu | ............... | B60G 7/003 280/124.134 |
| 2005/0280241 A1 * | 12/2005 | Bordini | ............... | B60G 3/18 280/124.135 |
| 2007/0176387 A1 * | 8/2007 | Tsuruta | ............... | B60G 11/15 280/124.135 |
| 2009/0184484 A1 * | 7/2009 | Gerrard | ............... | B60G 3/10 280/124.144 |
| 2012/0292876 A1 * | 11/2012 | Koide | ............... | B60G 11/16 280/124.179 |
| 2012/0326410 A1 * | 12/2012 | West | ............... | B60G 3/20 280/124.109 |
| 2013/0049318 A1 * | 2/2013 | Kwon | ............... | B60G 3/20 280/124.139 |
| 2013/0200587 A1 * | 8/2013 | Branger | ............... | F16F 1/3814 280/124.13 |
| 2015/0084300 A1 * | 3/2015 | Hopson | ............... | B60G 3/26 280/93.512 |
| 2019/0061451 A1 * | 2/2019 | Hacker | ............... | B60G 7/001 |
| 2021/0008939 A1 * | 1/2021 | Schmidt | ............... | B62D 7/146 |
| 2022/0153076 A1 * | 5/2022 | Friesen | ............... | B60G 7/003 |

FOREIGN PATENT DOCUMENTS

| | | |
|---|---|---|
| DE | 10247937 A1 | 5/2004 |
| DE | 10321877 A1 | 12/2004 |
| DE | 10321879 A1 | 12/2004 |
| DE | 102005030810 A1 | 1/2007 |
| DE | 102005049947 A1 | 5/2007 |
| DE | 102010023985 A1 | 8/2011 |
| DE | 102010017991 A1 | 10/2011 |
| DE | 102011055704 A1 | 5/2013 |
| DE | 102014225884 A1 | 6/2016 |
| DE | 202017001665 U1 | 7/2018 |
| DE | 102017205358 A1 | 10/2018 |
| EP | 2340177 A1 | 7/2011 |
| EP | 2758259 A1 | 7/2014 |

OTHER PUBLICATIONS

International Search Report (with English translation) and Written Opinion (with Machine translation) dated Apr. 3, 2020 in corresponding International Application No. PCT/EP2020/051498; 29 pages.

International Preliminary Report on Patentability dated Sep. 16, 2021 in corresponding International Application No. PCT/EP2020/051498; 20 pages.

European Examination Report dated Nov. 28, 2022, in corresponding European Application No. 20701603.1, 14 pages.

* cited by examiner

WHEEL SUSPENSION FOR A VEHICLE AXLE

FIELD

The invention relates to a wheel suspension for a vehicle axle of a two-track.

BACKGROUND

Such a wheel suspension has a wheel carrier carrying a vehicle wheel, which is articulated to a subframe or axle carrier of the vehicle via a multi-link assembly. The subframe is in turn connected to the vehicle body (e.g., the body side members) via subframe bearings.

A longitudinal force acts on the vehicle wheel when the vehicle drives over an edge or when it is accelerating or decelerating. With regard to longitudinal suspension comfort, prior-art subframe bearings, via which the subframe is connected to the body, are designed with an increased elastic longitudinal compliance in the vehicle's longitudinal direction to absorb the longitudinal force acting on the vehicle wheel. In the case of a trapezoidal link vehicle axle, in the prior art, this also results in the trapezoidal link being twisted and/or in the trapezoidal link being displaced longitudinally by a longitudinal path in the vehicle's longitudinal direction. In the above case, the trapezoidal link longitudinal path is limited in particular by stops on the trapezoidal link bearings located inside the vehicle.

In the event that the above vehicle axle, designed with regard to longitudinal suspension comfort, is operated electrically, the following situation arises: an electric machine can either be mounted on the subframe or close to the wheel on the trapezoidal link of the wheel suspension and be drivingly connected to the vehicle wheel via a drive shaft. In this case, when a longitudinal force acts on the vehicle wheel, the longitudinal displacement of the subframe and/or the trapezoidal link results in undesired electrical machine vibrations.

DE 10 2011 055 704 A1 discloses a generic multi-link rear axle for a motor vehicle having a trapezoidal link. DE 694 12 909 T2 also discloses a wheel suspension having a trapezoidal link.

SUMMARY

The object of the invention is to provide a wheel suspension with particularly high longitudinal comfort. In addition, the wheel suspension of an electrically operated vehicle axle is to avoid undesired vibrations due to the electric machine mass.

The invention is based on a wheel suspension, the wheel carrier of which is articulated to the vehicle body via a multi-link assembly. The multi-link assembly has a trapezoidal link designed as a four-point link, which has two connection points on the body side and two connection points on the wheel carrier side. According to the characterizing part, the connection points on the wheel carrier side are designed with greater elastic longitudinal compliance, that is, softer, than the connection points on the body side. Therefore, when a longitudinal force acts on the vehicle wheel, the wheel carrier is displaced by a longitudinal path in the vehicle's longitudinal direction with respect to the trapezoidal link (which is largely not displaced longitudinally). Due to the now greater longitudinal compliance on the wheel carrier side, the subframe bearings can be made more rigid. In particular, when combining the vehicle axle with an electric machine, this offers the following advantage: the electric machine can be disposed on the subframe or, when supported close to the wheel, on the trapezoidal link. Therefore, according to the invention, when a longitudinal force acts on the vehicle wheel, there is no or only minimal longitudinal movement of the subframe or the trapezoidal link due to the now more rigid subframe bearings and/or trapezoidal link bearings on the body side. Correspondingly, the electric machine mounted on the subframe or the trapezoidal link is also not subject to any longitudinal movements, thereby eliminating or significantly reducing undesired vibrations during travel.

In one technical implementation, the multi-link assembly is articulated to a subframe via connection points on the body side. The subframe is in turn connected to the vehicle body (e.g., body side members) via subframe bearings. The subframe or the trapezoidal link can carry an electric machine drivingly connected to the vehicle wheel via a drive shaft. According to the invention, in the vehicle's longitudinal direction, compared to the trapezoidal link connection points on the wheel carrier side, the subframe bearings and the connection points of the multi-link assembly on the body side are designed such that most of the longitudinal compliance results from the connection on the wheel carrier side.

In addition to the trapezoidal link, the multi-link assembly can have exactly three further suspension links. In particular, these can be provided in the form of two-point links, each with a connection point on the body side and a connection point on the wheel carrier side. Preferably, the three further suspension links can be implemented as control arms extending in alignment with the vehicle's transverse direction. All of the connection points of the multi-link assembly on the body side and on the wheel carrier side can be implemented as swivel bearings having a swivel axis aligned with the vehicle's longitudinal direction.

When a longitudinal force acts on the vehicle wheel, the three further suspension links can determine the wheel carrier movement. This mainly includes longitudinal displacement of the wheel carrier, superimposed by a slight toe-in or toe-out rotation of the wheel carrier.

In a specific embodiment variant, the trapezoidal link can be disposed in a lower link plane together with a suspension link below the vehicle. In the lower link plane, the lower suspension link can be positioned underneath the trapezoidal link with a free vertical offset. Thus, the connection point of the lower suspension link on the wheel carrier side can be disposed underneath the trapezoidal link connection points on the wheel carrier side with a vertical offset.

An upper suspension link at the front of the vehicle and an upper suspension link at the rear of the vehicle can be disposed in an upper link plane. The connection point of the front upper suspension link on the wheel carrier side and the trapezoidal link connection points at the front of the vehicle can be disposed in front of a vehicle wheel rotation axis in the direction of travel. In contrast, both the connection points of the lower suspension link on the wheel carrier side and the upper suspension link at the rear of the vehicle and the trapezoidal link connection points at the rear of the vehicle can be disposed behind the vehicle wheel rotation axis.

In a further improvement of the invention, the connection point of the front upper suspension link on the wheel carrier side can be disposed in front of the front trapezoidal link connection point on the wheel carrier side with a longitudinal offset. Alternatively and/or additionally, the connection point of the front upper suspension link on the wheel carrier side can be disposed above the front trapezoidal link connection point on the wheel carrier side with an upward offset.

The connection point of the rear upper suspension link on the wheel carrier side can be disposed above the rear trapezoidal link connection point on the wheel carrier side with an upward offset. Alternatively and/or additionally, the connection point of the rear upper suspension link on the wheel carrier side can be disposed in front of the rear trapezoidal link connection point on the wheel carrier side with a longitudinal offset.

In a first embodiment variant, the trapezoidal link connection points on the wheel carrier side can be implemented as rubber-metal sleeve bearings. To limit the longitudinal path of the wheel carrier (when a longitudinal force acts on the vehicle wheel), axially acting longitudinal stops can be provided in the respective rubber-metal sleeve bearing. Each of the rubber-metal sleeve bearings can have an inner bearing sleeve passed through by a bearing pin defining the swivel axis, an outer bearing sleeve connected to the trapezoidal bearing, and an elastomer body. The elastomer body can connect the inner bearing sleeve and the outer bearing sleeve to each other. The bearing pin can be supported in opposite trapezoidal link console wings.

In a second embodiment variant, the trapezoidal link connection points on the wheel carrier may not be implemented as rubber-metal sleeve bearings, but rather each be provided with coupling rods via which the trapezoidal link is suspended from the wheel carrier. Each of the coupling rods can be articulated at a lower articulation point on the trapezoidal link and can be articulated at an upper articulation point on the wheel carrier. The articulation points can be implemented as swivel bearings with swivel axes aligned with the vehicle's transverse direction. To limit the longitudinal path of the wheel carrier, a spring-damper element can be interposed between the trapezoidal link and the wheel carrier.

In the following, an exemplary embodiment of the invention is described with reference to the accompanying figures.

DETAILED DESCRIPTION

Figure 1:
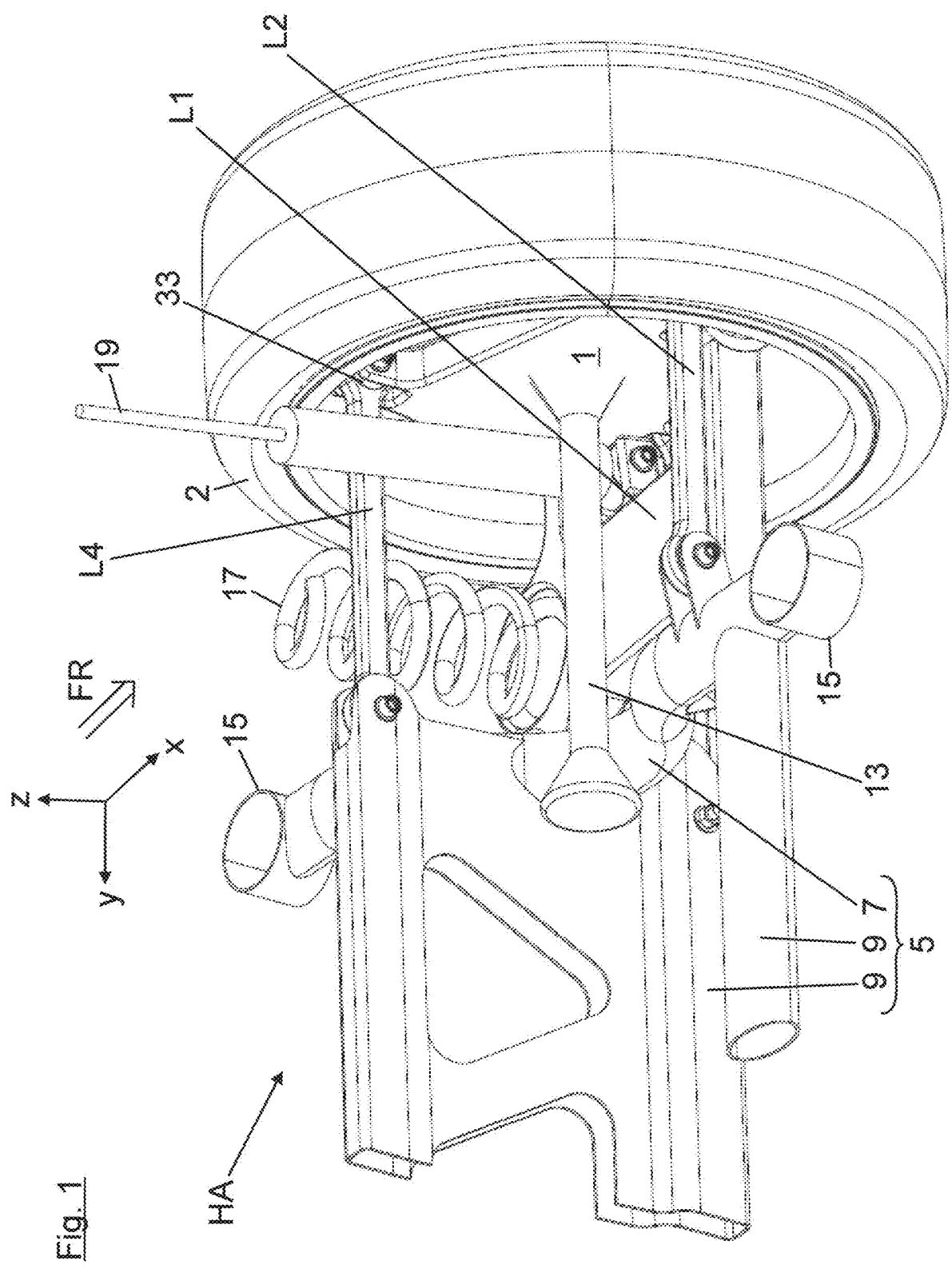
FIG. 1 shows a view of a wheel suspension for a vehicle axle of a two-track vehicle according to a first exemplary embodiment.
Figure 2:
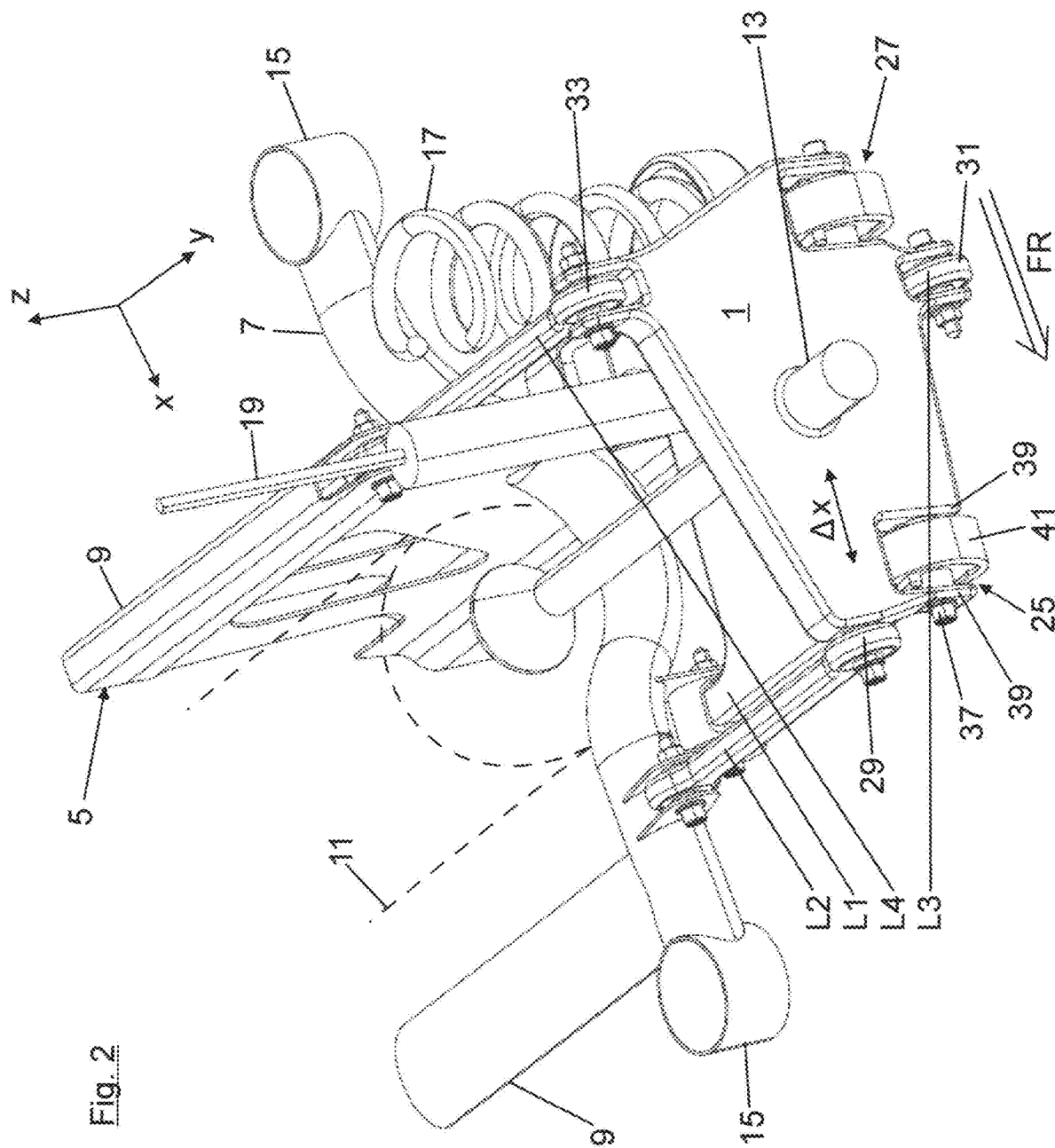
FIG. 2 shows a view of a wheel suspension for a vehicle axle of a two-track vehicle according to a first exemplary embodiment.

FIG. 1 shows the left wheel suspension of an electrically operated rear axle HA of a two-track vehicle. The right-hand wheel suspension, not shown in the figures, is designed as a mirror image with respect to a vehicle longitudinal center plane. In FIG. 1, the wheel suspension has a wheel carrier 1 carrying a vehicle wheel 2, which is articulated to a subframe 5 on the body side via a multi-link assembly 3 (only shown in FIG. 2). In FIG. 1, subframe 5 has two lateral subframe side members 7, only one of which is shown in FIG. 1 or 2. The two subframe side members 7 are connected to each other by front and rear subframe cross members 9. In FIG. 2, subframe 5 carries an electric machine 11, only roughly schematically indicated by a dashed line. Electric machine 11 is drivingly connected to vehicle wheel 2 via a drive shaft 13. In FIG. 1 or 2, subframe side member 7 is connected to the vehicle body by implied front and rear subframe bearings 15.

Figure 4:
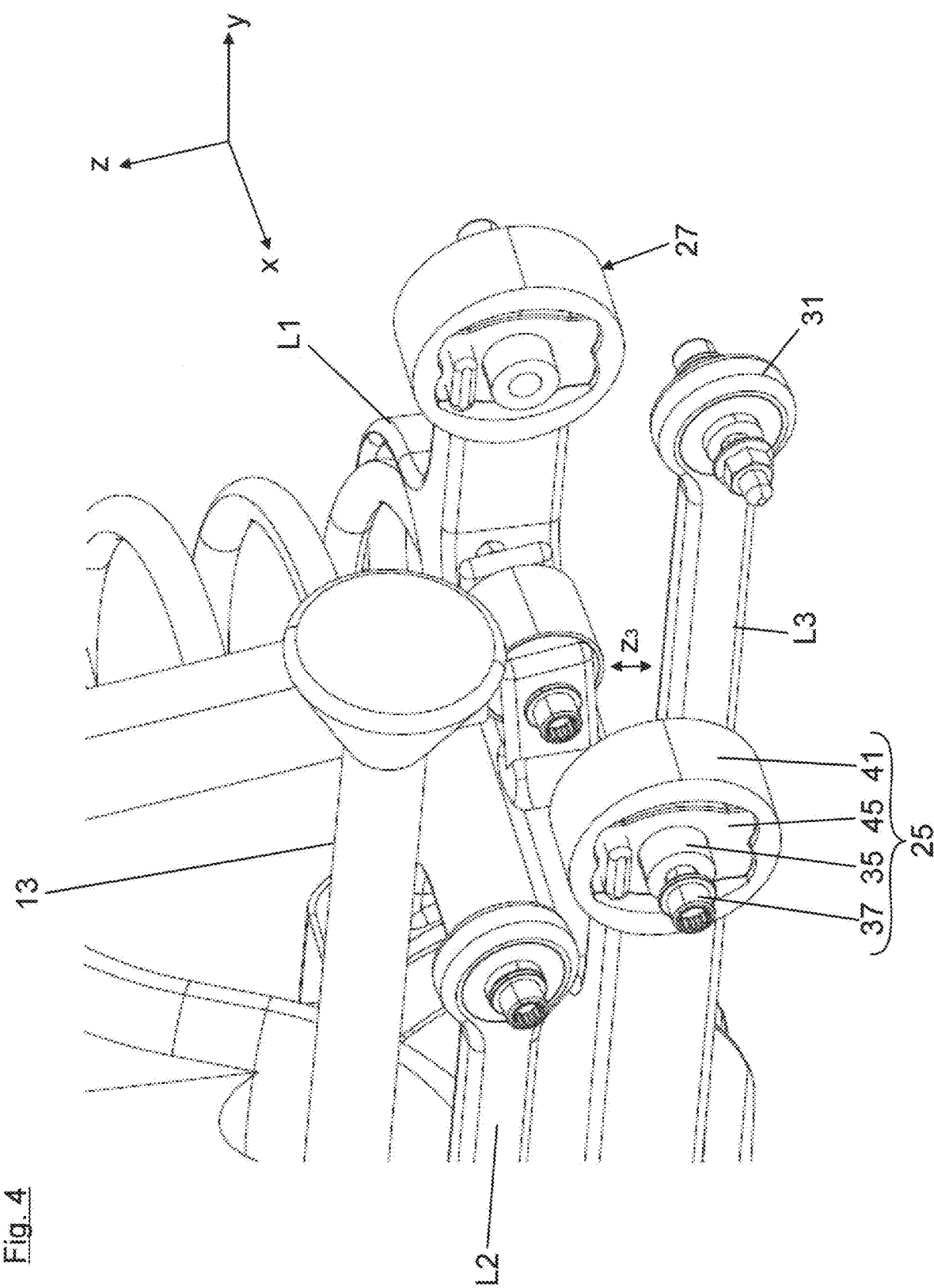
FIG. 4 shows a view of a wheel suspension for a vehicle axle of a two-track vehicle according to a first exemplary embodiment.

As can also be seen from the figures, multi-link assembly 3 has a trapezoidal link L1 in the form of a four-point link. The latter is disposed in a lower link plane, together with a lower suspension link L3 disposed beneath trapezoidal link L1 with an upward offset $z_3$ (FIG. 4). A front upper suspension link L2 and a rear upper suspension link L4 are disposed in an upper link plane of the wheel suspension. Trapezoidal link L1 has a planar, plate-like main body supporting a suspension spring 17 and a telescopic shock absorber 19. Trapezoidal link L1 is implemented as a four-point link, articulated to two connection points 21, 23 on subframe 5 on the body side and to two connection points 25, 27 on wheel carrier 1 on the wheel carrier side. In FIG. 1, the further suspension links L2, L3 and L4 are designed as two-point links, each with a connection point on the body side and a connection point 29, 31, 33 on the wheel carrier side. The three suspension links L2, L3, L4 are control arms, extending in alignment with the vehicle's transverse direction y. In the figures, all of the connection points of multi-link assembly 3 on the body side and on the wheel carrier side are implemented as swivel bearings having a swivel axis $S_x$ aligned with the vehicle's longitudinal direction x.

Figure 3:
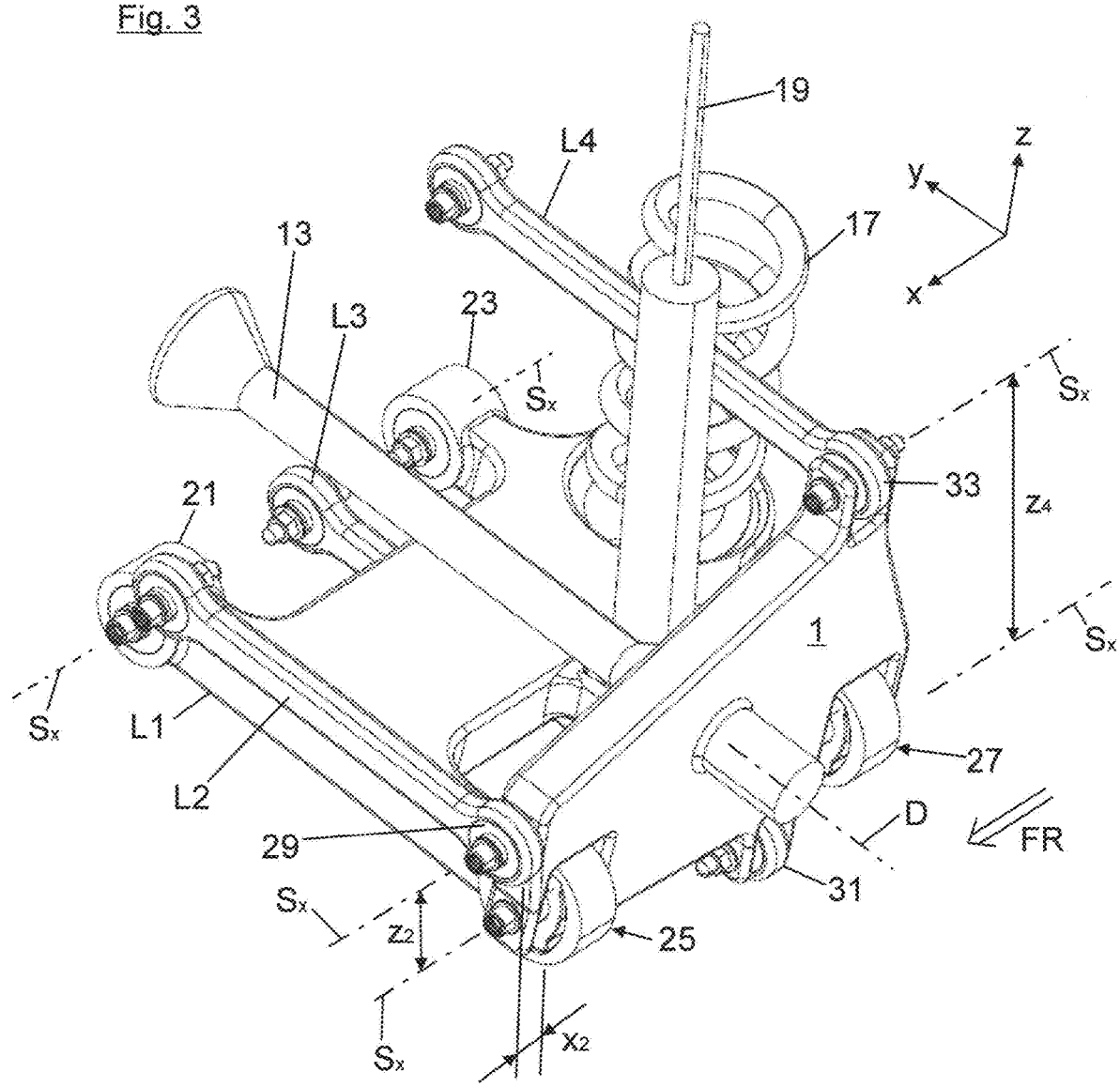
FIG. 3 shows a view of a wheel suspension for a vehicle axle of a two-track vehicle according to a first exemplary embodiment.

In the following, the link assembly is described in detail: accordingly, connection point 29 of front upper suspension link L2 on the wheel carrier side and the two trapezoidal link connection points 21, 25 at the front of the vehicle are disposed in front of a vehicle wheel rotation axis D (FIG. 3) in direction of travel FR. In FIGS. 2 and 3, respectively, connection point 31 of lower suspension link L3 on the wheel carrier side and connection point 33 of rear upper suspension link L4 on the wheel carrier side are arranged behind vehicle wheel rotation axis D.

In FIG. 2, connection point 29 of front upper suspension link L2 on the wheel carrier side is disposed in front of front trapezoidal link connection point 25 on the wheel carrier side with a longitudinal offset $x_2$ (FIG. 3). Moreover, connection point 29 of front upper suspension link L2 on the wheel carrier side is positioned above front trapezoidal link connection point 25 on the wheel carrier side with an upward offset $z_2$ (FIG. 2).

Connection point 33 of rear upper suspension link L4 on the wheel carrier side is positioned above rear trapezoidal link connection point 27 on the wheel carrier side with an upward offset $z_4$. Further, connection point 33 on the wheel carrier side is positioned in front of rear trapezoidal link connection point 27 on the wheel carrier side with a longitudinal offset.

Front trapezoidal link connection points 21, 25 on the body side and on the wheel carrier side are positioned next to each other in approximate alignment with the vehicle's transverse direction y. In the same manner, rear trapezoidal link connection points 23, 27 on the body side and on the wheel carrier side are positioned in transverse alignment with each other.

In the first exemplary embodiment of FIGS. 1 to 4, trapezoidal link connection points 25, 27 on the wheel carrier side are implemented as rubber-metal sleeve bearings. In FIG. 4, each of the rubber-metal sleeve bearings has an inner bearing sleeve 35 passed through by a bearing pin 37 defining swivel axis S. Bearing pin 37 is screwed to each of wheel carrier console wings 39 (FIG. 2). The rubber-metal sleeve bearing is press-fitted into a lug 41 on the outside of the trapezoidal link.

The essence of the invention is the fact that trapezoidal link connection points 25, 27 on the wheel carrier side, implemented as rubber-metal sleeve bearings, are designed with greater elastic longitudinal compliance, that is, softer, than trapezoidal link connection points 21, 23 on the body side and subframe bearing 15. Hence, when a longitudinal force acts on vehicle wheel 2 during travel, wheel carrier 1 is displaced by a longitudinal path Δx (FIG. 2) in the vehicle's longitudinal direction x with respect to trapezoidal link L1. Trapezoidal link L1 and subframe 5, on the other hand, are not or only slightly displaced in the vehicle's longitudinal direction x. To limit the wheel carrier longitudinal path Δx, the rubber-metal sleeve bearings have axially acting longitudinal stops.

The longitudinal displacement across longitudinal path Δx of wheel carrier 1 is determined by the three suspension links L2, L3 and L4. As such, the longitudinal displacement of wheel carrier 1 can be superimposed by a slight toe-in or toe-out rotation.

Figure 5:
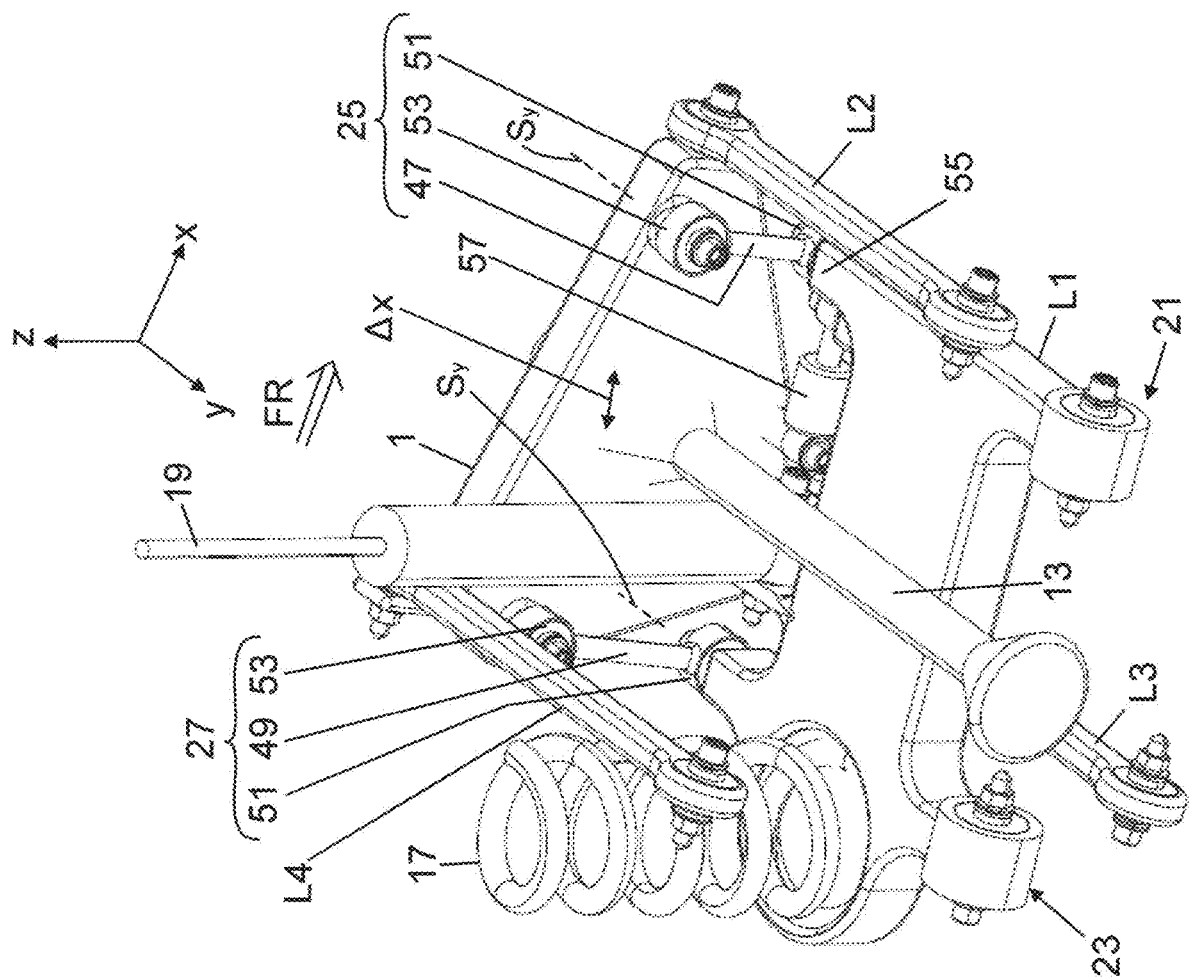
FIG. 5 shows a further view of a second exemplary embodiment of the wheel suspension.
Figure 6:
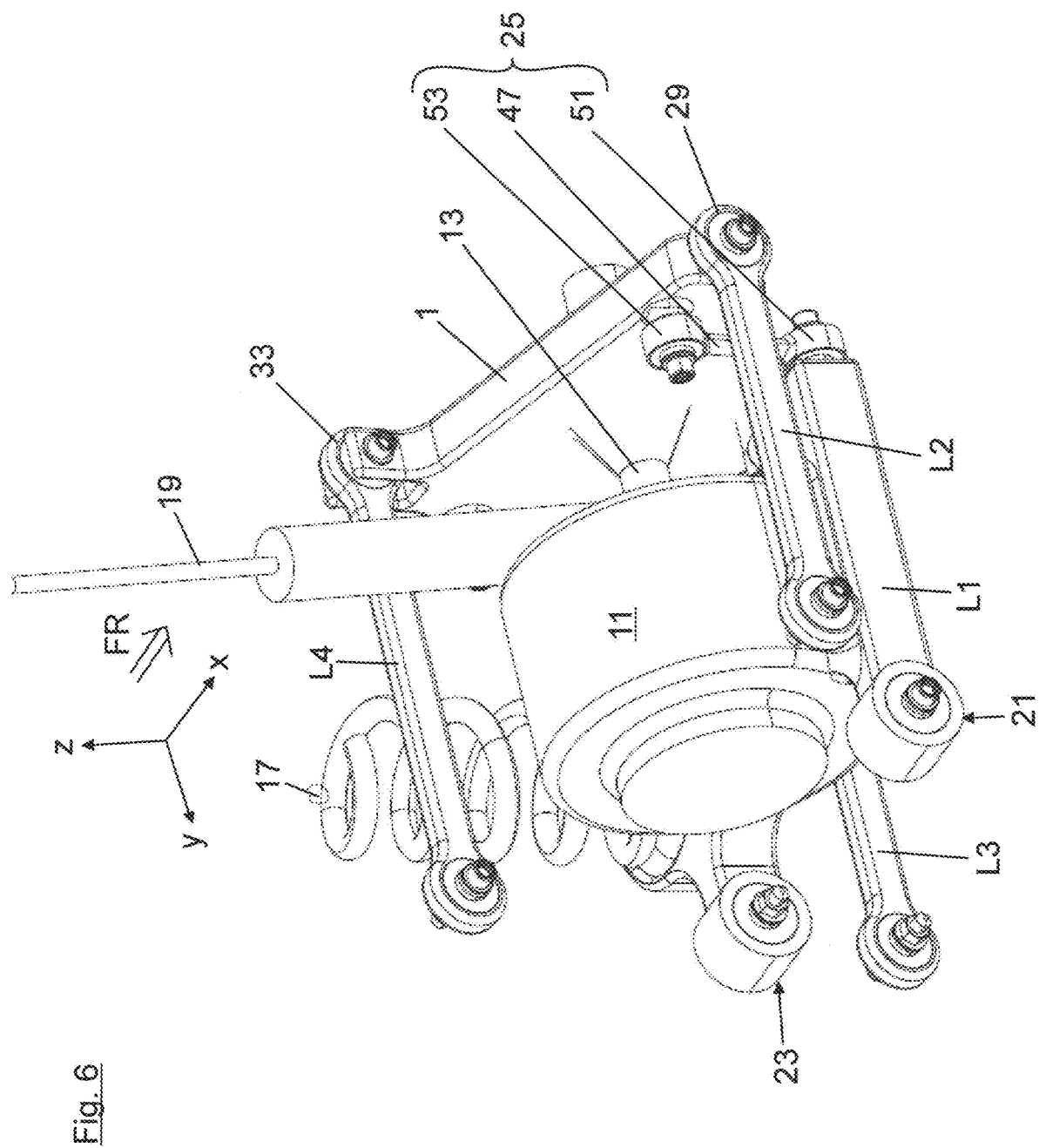
FIG. 6 shows a further view of a second exemplary embodiment of the wheel suspension.

FIG. 5 or 6 shows a wheel suspension according to a second exemplary embodiment. The basic structure and functionality of the wheel suspension shown in FIG. 5 or 6 are essentially identical to the structure/functionality of the first exemplary embodiment. Contrary to FIG. 1, in the second exemplary embodiment, trapezoidal link connection points 25, 27 on the wheel carrier side are not implemented as rubber-metal sleeve bearings, but with a coupling rod 47, 49 each.

In FIG. 5 or 6, both coupling rods 47, 49 are roughly vertically oriented. Each of coupling rods 47, 49 is articulated at a lower articulation point 51 on trapezoidal link L1 and is articulated at an upper articulation point 53 on wheel carrier 1. Upper and lower articulation points 51, 53 are designed as swivel bearings having swivel axes $S_y$ aligned with the vehicle's transverse direction y. To limit the longitudinal path Δx of the wheel carrier, a spring-damper element 57 is disposed between a front suspension arm 55 of trapezoidal link L1 and wheel carrier 1.

In FIG. 6, electric machine 11 is not supported on subframe 5, but is supported directly on trapezoidal link L1 by being mounted close to the wheel, namely, between front upper link L2 and rear upper link L4.

LIST OF REFERENCE NUMERALS

1 Wheel carrier
2 Vehicle wheel
3 Multi-link assembly
5 Subframe
7 Subframe side member
9 Subframe cross member
11 Electric machine
13 Drive shaft
15 Subframe bearing
17 Suspension spring
19 Shock absorber
21 Front trapezoidal link connection point on the body side
23 Rear trapezoidal link connection point on the body side
25 Front trapezoidal link connection point on the wheel carrier side
27 Rear trapezoidal link connection point on the wheel carrier side
29, 31, 33 Connection points of links L2, L3, L4 on the wheel carrier side
35 Inner bearing sleeve
37 Bearing pin
39 Console wing of the wheel carrier
41 Bearing seat within the trapezoidal link
45 Elastomer body
47, 49 Coupling rod
51 Lower articulation point
53 Upper articulation point
$S_x$, $S_y$ Swivel axes
55 Trapezoidal link suspension arm
57 Spring-damper element
L1 Trapezoidal link
L2, L3, L4 Control arms
HA Vehicle axle
D Vehicle wheel rotation axis
FR Direction of travel
Δx Longitudinal path
$S_x$, $S_y$ Swivel axes

The invention claimed is:

1. A wheel suspension for a vehicle axle of a two-track vehicle, comprising:
a wheel carrier carrying a vehicle wheel, which is able to be articulated to a vehicle body via a multi-link assembly, which multi-link assembly has a trapezoidal link in the form of a four-point link with two connection points on the body side and with two connection points on the wheel carrier side, wherein both trapezoidal link connection points on the wheel carrier side are designed with greater elastic longitudinal compliance, that is, softer, than the trapezoidal link connection points on the body side, and wherein, when a longitudinal force acts on the vehicle wheel, the wheel carrier is displaceable by a longitudinal path in the vehicle's longitudinal direction with respect to the trapezoidal link, wherein the multi-link assembly is articulated to a subframe via the connection points on the body side, and wherein the subframe is connected to the vehicle body via a subframe bearing, and wherein the subframe, or the trapezoidal link carries an electric machine, drivingly connected to the vehicle wheel via a drive shaft.

2. The wheel suspension according to claim 1, wherein the subframe bearing and the connection points of the multi-link assembly on the body side are designed with reduced elastic longitudinal, that is, harder, compliance in the vehicle longitudinal direction than the trapezoidal link connection points on the wheel carrier side.

3. The wheel suspension according to claim 2, wherein, in addition to the trapezoidal link, the multi-link assembly has exactly three further suspension links, each, as two-point links, having one connection point on the body side and one connection point on the wheel carrier side, wherein the three suspension links are implemented as control arms extending in alignment with the vehicle's transverse direction, wherein the connection points of the multi-link assembly on the body side and on the wheel carrier side are implemented as swivel bearings having a swivel axis aligned with the vehicle's longitudinal direction.

4. The wheel suspension according to claim 2, wherein the trapezoidal link connection points on the wheel carrier side are implemented as rubber-metal sleeve bearings, wherein to limit the wheel carrier longitudinal path, axially acting longitudinal stops are provided in the rubber-metal sleeve bearings, wherein, on the wheel carrier side, each of the rubber-metal sleeve bearings is press-fitted into the bearing seats within the trapezoidal link, and has an inner bearing sleeve passed through by a bearing pin defining the swivel axis, and an elastomer body, wherein the bearing pin is supported in console wings of the wheel carrier.

5. The wheel suspension according to claim 2, wherein each of the trapezoidal link connection points on the wheel carrier side is implemented with a coupling rod, and wherein the coupling rod is articulated to a lower articulation point on the trapezoidal link and is articulated to an upper articulation point on the wheel carrier, and wherein, the articulation points are swivel bearings having swivel axes in alignment with the vehicle transverse direction, and/or wherein, to limit the wheel carrier longitudinal path, a spring-damper element acts between the trapezoidal link and the wheel carrier.

6. The wheel suspension according to claim 1, wherein, in addition to the trapezoidal link, the multi-link assembly has exactly three further suspension links, each, as two-point links, having one connection point on the body side and one connection point on the wheel carrier side, wherein the three suspension links are implemented as control arms extending in alignment with the vehicle's transverse direction, wherein the connection points of the multi-link assembly on the body side and on the wheel carrier side are implemented as swivel bearings having a swivel axis aligned with the vehicle's longitudinal direction.

7. The wheel suspension according to claim 6, wherein the trapezoidal link is disposed in a lower link plane together with a suspension link below the vehicle, in which the suspension link below the vehicle is positioned beneath the trapezoidal link with an upward offset, and wherein a front upper suspension link and a rear upper suspension link are disposed in an upper link plane, wherein the connection point of the front upper suspension link on the wheel carrier side and the front trapezoidal link connection point are disposed in front of a vehicle wheel rotation axis in the direction of travel, and wherein the connection points of the lower suspension link and the rear upper suspension link on the wheel carrier side and the trapezoidal link connection point at the rear of the vehicle are disposed behind the vehicle wheel rotation axis.

8. The wheel suspension according to claim 7, wherein the connection point of the front upper suspension link on the wheel carrier side is disposed in front of the front trapezoidal link connection point on the wheel carrier side with a longitudinal offset and above the same with an upward offset, wherein the connection point of the rear upper suspension link on the wheel carrier side is disposed above the rear trapezoidal link connection point on the wheel carrier side with an upward offset and/or in front thereof with a longitudinal offset.

9. The wheel suspension according to claim 8, wherein the trapezoidal link connection points on the wheel carrier side are implemented as rubber-metal sleeve bearings, wherein to limit the wheel carrier longitudinal path, axially acting longitudinal stops are provided in the rubber-metal sleeve bearings, wherein, on the wheel carrier side, each of the rubber-metal sleeve bearings is press-fitted into the bearing seats within the trapezoidal link, and has an inner bearing sleeve passed through by a bearing pin defining the swivel axis, and an elastomer body, wherein the bearing pin is supported in console wings of the wheel carrier.

10. The wheel suspension according to claim 7, wherein the trapezoidal link connection points on the wheel carrier side are implemented as rubber-metal sleeve bearings, wherein to limit the wheel carrier longitudinal path, axially acting longitudinal stops are provided in the rubber-metal sleeve bearings, wherein, on the wheel carrier side, each of the rubber-metal sleeve bearings is press-fitted into the bearing seats within the trapezoidal link, and has an inner bearing sleeve passed through by a bearing pin defining the swivel axis, and an elastomer body, wherein the bearing pin is supported in console wings of the wheel carrier.

11. The wheel suspension according to claim 7, wherein each of the trapezoidal link connection points on the wheel carrier side is implemented with a coupling rod, and wherein the coupling rod is articulated to a lower articulation point on the trapezoidal link and is articulated to an upper articulation point on the wheel carrier, and wherein, the articulation points are swivel bearings having swivel axes in alignment with the vehicle transverse direction, and/or wherein, to limit the wheel carrier longitudinal path, a spring-damper element acts between the trapezoidal link and the wheel carrier.

12. The wheel suspension according to claim 6, wherein the trapezoidal link connection points on the wheel carrier side are implemented as rubber-metal sleeve bearings, wherein to limit the wheel carrier longitudinal path, axially acting longitudinal stops are provided in the rubber-metal sleeve bearings, wherein, on the wheel carrier side, each of the rubber-metal sleeve bearings is press-fitted into the bearing seats within the trapezoidal link, and has an inner bearing sleeve passed through by a bearing pin defining the swivel axis, and an elastomer body, wherein the bearing pin is supported in console wings of the wheel carrier.

13. The wheel suspension according to claim 6, wherein each of the trapezoidal link connection points on the wheel carrier side is implemented with a coupling rod, and wherein the coupling rod is articulated to a lower articulation point on the trapezoidal link and is articulated to an upper articulation point on the wheel carrier, and wherein, the articulation points are swivel bearings having swivel axes in alignment with the vehicle transverse direction, and/or wherein, to limit the wheel carrier longitudinal path, a spring-damper element acts between the trapezoidal link and the wheel carrier.

14. The wheel suspension according to claim 1, wherein the trapezoidal link connection points on the wheel carrier side are implemented as rubber-metal sleeve bearings, wherein to limit the wheel carrier longitudinal path, axially acting longitudinal stops are provided in the rubber-metal sleeve bearings, wherein, on the wheel carrier side, each of the rubber-metal sleeve bearings is press-fitted into the bearing seats within the trapezoidal link, and has an inner bearing sleeve passed through by a bearing pin defining the swivel axis, and an elastomer body, wherein the bearing pin is supported in console wings of the wheel carrier.

15. The wheel suspension according to claim 1, wherein each of the trapezoidal link connection points on the wheel carrier side is implemented with a coupling rod, and wherein the coupling rod is articulated to a lower articulation point on the trapezoidal link and is articulated to an upper articulation point on the wheel carrier, and wherein, the articulation points are swivel bearings having swivel axes in alignment with the vehicle transverse direction, and/or wherein, to limit the wheel carrier longitudinal path, a spring-damper element acts between the trapezoidal link and the wheel carrier.

16. The wheel suspension according to claim 1, wherein the electric machine is supported on the trapezoidal link between the front upper link and the rear upper link.

\* \* \* \* \*